United States Patent
Hopple

(10) Patent No.: US 9,463,406 B2
(45) Date of Patent: Oct. 11, 2016

(54) AIR FILTER MONITORING TAB

(71) Applicant: The Boeing Company, Chicago, IL (US)

(72) Inventor: David E. Hopple, Maple Valley, WA (US)

(73) Assignee: THE BOEING COMPANY, Chicago, IL (US)

( * ) Notice: Subject to any disclaimer, the term of this patent is extended or adjusted under 35 U.S.C. 154(b) by 115 days.

(21) Appl. No.: 14/503,232

(22) Filed: Sep. 30, 2014

(65) Prior Publication Data

US 2016/0089624 A1    Mar. 31, 2016

(51) Int. Cl.
   *B60H 3/06* (2006.01)
   *B01D 46/00* (2006.01)

(52) U.S. Cl.
   CPC ....... *B01D 46/0086* (2013.01); *B01D 46/0002* (2013.01)

(58) Field of Classification Search
   CPC .......... B01D 46/0086; B01D 46/4254; B01D 46/446; B60H 3/06; B60H 2003/0683; F24F 2011/0093; Y10S 55/34; Y10S 116/25
   USPC ............ 55/DIG. 34; 116/268, 271, 270, 272, 116/266, DIG. 25; 96/421, 416, 417, 418, 96/422; 73/31.04
   See application file for complete search history.

(56) References Cited

U.S. PATENT DOCUMENTS

| | | | | |
|---|---|---|---|---|
| 5,352,255 A * | 10/1994 | Taft | ...................... | B01D 35/143 116/70 |
| 5,616,157 A * | 4/1997 | Mead | ................. | B01D 46/0086 116/268 |
| 6,190,442 B1 * | 2/2001 | Redner | .............. | B01D 46/0086 116/268 |
| 6,743,281 B1 * | 6/2004 | Miller | ................ | B01D 46/0086 116/DIG. 25 |
| 6,837,922 B2 * | 1/2005 | Gorin | ................. | B01D 46/0086 116/112 |
| 7,594,960 B2 * | 9/2009 | Johansson | ............ | B01D 46/521 116/DIG. 25 |
| 7,621,978 B2 * | 11/2009 | Johansson | .............. | B01D 46/10 116/112 |
| 7,686,872 B2 * | 3/2010 | Kang | ................. | B01D 46/0086 55/385.3 |
| 7,713,339 B2 * | 5/2010 | Johansson | .............. | B01D 46/10 116/266 |
| 2010/0084347 A1 * | 4/2010 | Wilder | .................... | C02F 1/003 210/717 |

* cited by examiner

*Primary Examiner* — Jacob T Minskey
*Assistant Examiner* — Minh-Chau Pham
(74) *Attorney, Agent, or Firm* — MH2 Technology Law Group, LLP

(57) ABSTRACT

An apparatus and method for monitoring reduced fluid flow through a filter. A filter, more particularly a fluid flow filter or an air filter when contaminated can suffer from a reduced fluid flow, which will often deform to match the fluid flow or more particularly in the case of an air filter—the air flow.

10 Claims, 4 Drawing Sheets

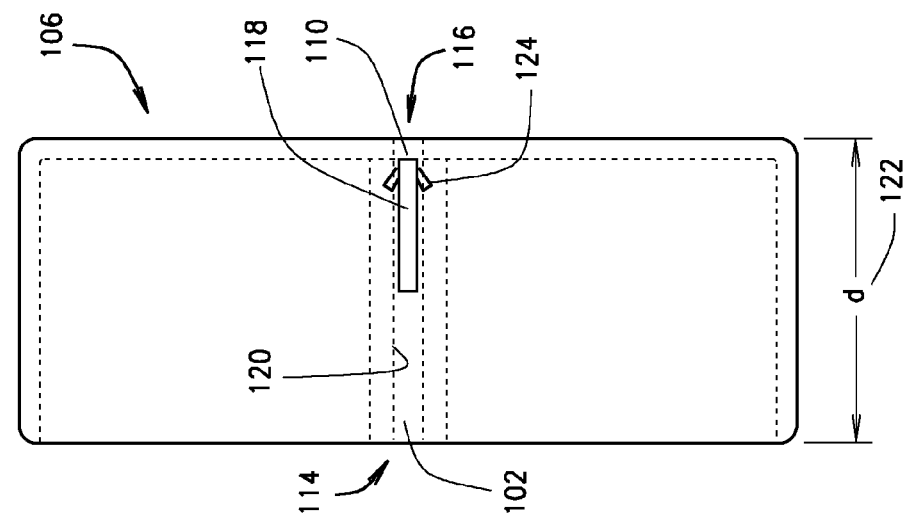
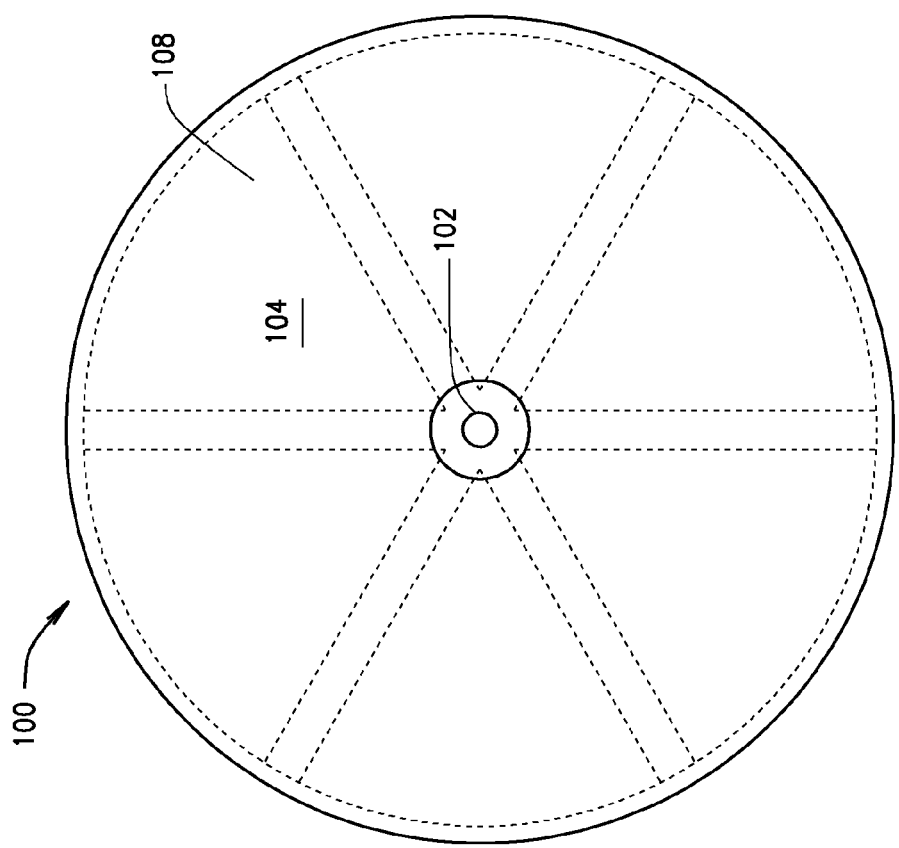

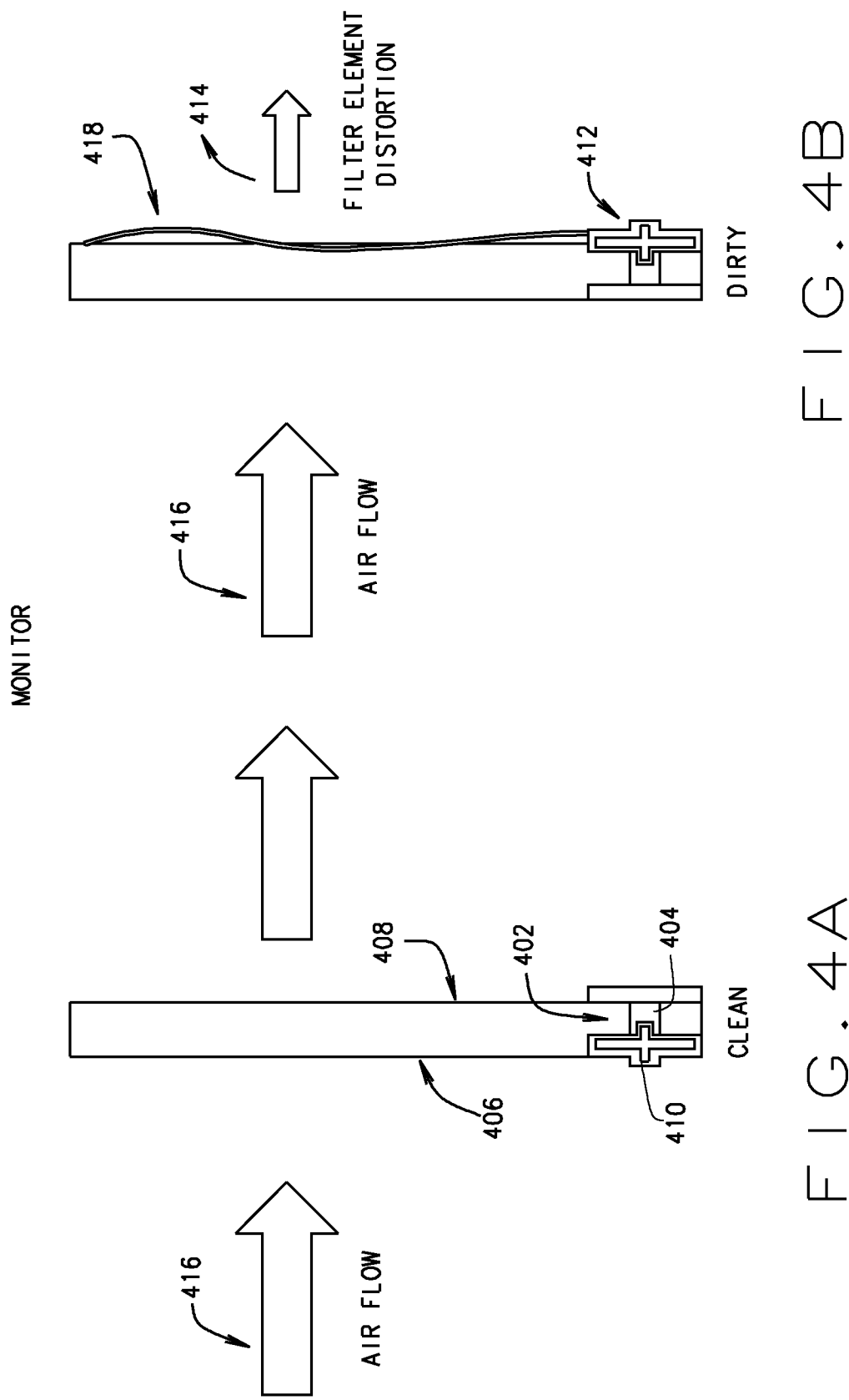

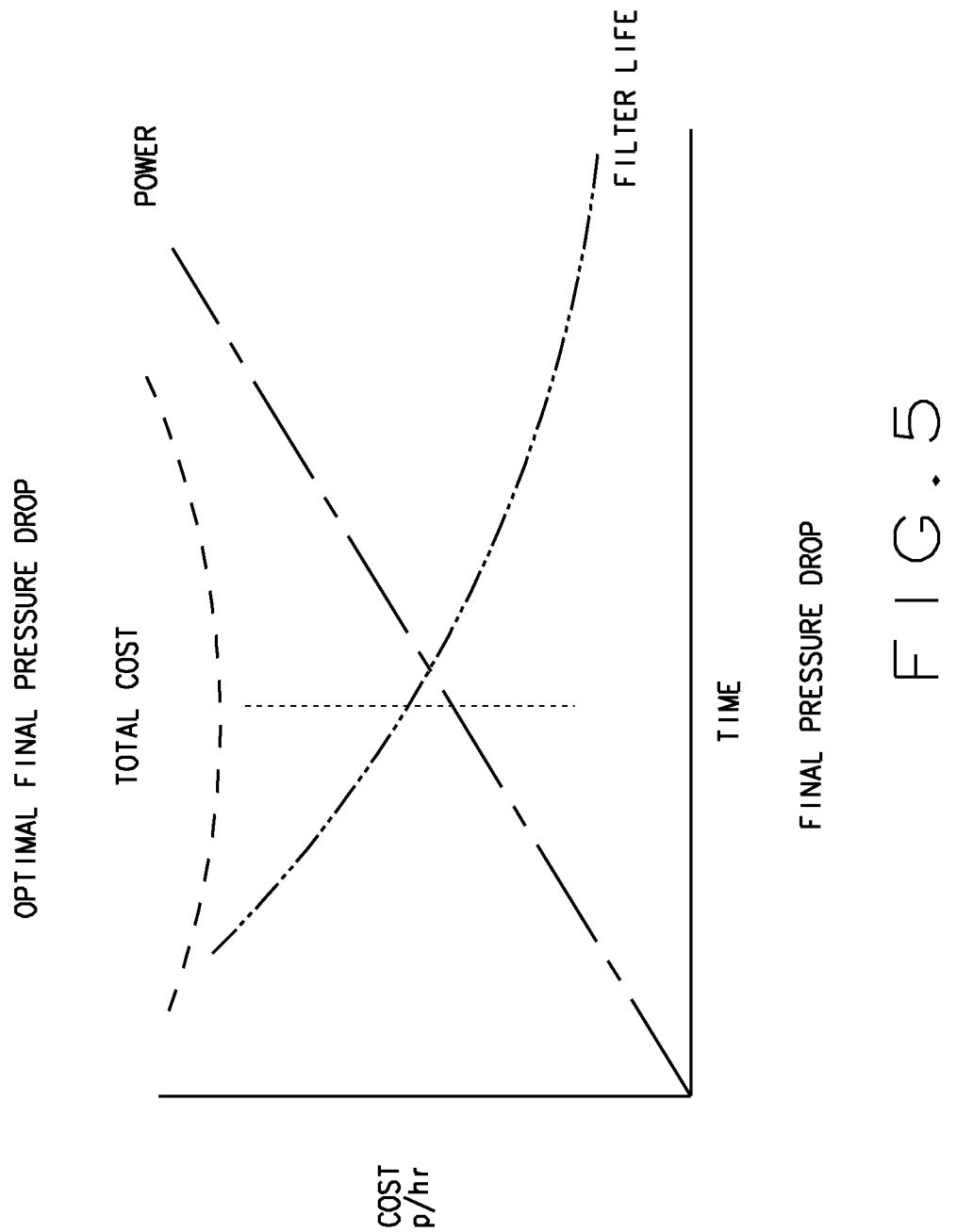

AIR FILTER MONITORING TAB

BACKGROUND

1. Field

The present disclosure relates filters in fluid flow systems, and more particularly to an apparatus and method of monitoring an air filter.

2. Background

Current fluid flow filters particularly air filters are not configured with an apparatus for monitoring the filter for flow or more particularly reduced flow through the filter due to contamination. For some air flow systems critical air filters are monitored for air flow through the air filter by using a magnehelic pressure gauge, which relies on sample ports before and after the filter. These ports can become plugged rendering the magnehelic useless. Further, the magnehelic pressure gauges that are utilized can be relatively expensive considering the function they perform and the clogging of the sampling ports that can occur.

A more cost effective apparatus and method for monitoring the flow through a filter is needed

SUMMARY

The technology and the various implementations as disclosed herein is an apparatus and method for monitoring reduced fluid flow through a filter. A filter, more particularly a fluid flow filter or an air filter when contaminated can suffer from a reduced fluid flow, which will often deform to match the fluid flow or more particularly in the case of an air filter—the air flow. In one implementation of a valve device, such as a poppet valve style device that can be latched, can be used to indicate when the flow is reduced by a predetermined amount to indicate the need for a replacement of the filter. The reduced fluid flow due to filter contamination can result in increased pressure at the filter because assuming the fluid flow rate is constant and evenly distributed throughout the duct leading to the filter, as the filter is clogged with contamination thereby reducing fluid flow through the filter, the pressure at the filter will increase. When using this methodology, each size filter would have a correctly sized indicator that will appropriately respond to the amount of fluid flow and pressure created on the side of the filter facing the on-coming flow of fluid indicative of a contaminated filter the needs replacing.

One implementation of the technology is an apparatus for monitoring reduced fluid flow through a filter including an enclosed open ended channel extending from a facing side of a filter to a trailing side of the filter. This implementation can further include a shuttle piston slidably fitting within said open ended channel and configured to resistively reciprocate through said open ended channel from the facing side of the filter to the trailing side of the filter responsive to a fluid flow pressure indicative of a predetermined reduction in a fluid flow. The shuttle piston can be generally functionally referred to as a shuttle valve member, however, the member in this case is not designed to stop or impede fluid flow when it is engaged. The enclosed open ended channel can extend in a direction substantially parallel to the direction of fluid flow such that the vector of fluid flow and the pressure caused thereby so that reciprocation of the shuttle is affected.

The shuttle piston can be a member such as a ball, a disk or short cylinder fitting closely within a channel such as a duct or a tube in which it freely or resistively reciprocates back and forth from one end of the channel to an opposing end of the channel (moves up and down) against or responsive to a liquid or gas flow or pressure. The member's movement can be similar to that of a piston valve element that moves freely within the tube. When pressure from a fluid is exerted through an opening on one end it pushes the member towards the opposite end. The resistance to reciprocation from one end to the opposing end can simply be due to the weight of the member is such that it will only be moved or caused to reciprocated when a certain level of pressure is present from the fluid flow the is sufficient to move the member of the particular weight. Other characteristics can be designed into the shuttle piston to resist movement such as a surface of the shuttle piston in contact with the channel's interior surface can be roughened or uneven or the exterior surface of the shuttle piston can be constructed of a material that causes a resistive frictional force with contacting surfaces.

Another implementation of the technology as disclosed herein is an apparatus for monitoring reduced fluid flow through a filter, which includes an enclosed open ended channel configured to extend a predetermined length where the predetermined length is sufficient to extend a distance corresponding to a thickness of a predetermined filter size. The apparatus further includes a shuttle piston slidably fitting within said open ended channel and configured to resistively reciprocate through said open ended channel from a facing side of the open ended channel to a trailing side of the open ended channel responsive to a predetermined fluid flow pressure. Again, the shuttle piston can be a member such as a ball, a disk or short cylinder fitting closely within a channel such as a duct or a tube in which it freely or resistively reciprocates back and forth from one end of the channel to an opposing end of the channel (moves up and down) against or responsive to a liquid or gas flow or pressure.

Another implementation of the technology is a method for monitoring reduced fluid flow through a filter, which includes the process of extending an enclosed open ended channel extending from a facing side of a filter through to a trailing side of the filter, where said enclosed open ended channel includes a shuttle piston slidably fitting within said open ended channel and configured to resistively reciprocate through said open ended channel from the facing side of the filter to the trailing side of the filter responsive to a fluid flow pressure indicative of a predetermined reduction in a fluid flow. The shuttle piston can be designed to resist movement when the flow pressure is sufficiently below a threshold indicative of a filter needing replacement.

Again the shuttle piston can be a member such as a ball, a disk or short cylinder fitting closely within a channel such as a duct or a tube in which it freely or resistively reciprocates back and forth from one end of the channel to an opposing end of the channel (moves up and down) against or responsive to a liquid or gas flow or pressure. The valve or piston element moves freely within the tube. When pressure from a fluid is exerted through an opening on one end it pushes the member towards the opposite end.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawing in which:

FIG. 1A is an illustration of an apparatus for monitoring reduced fluid flow through a filter;

FIG. 1B is another illustration of an apparatus for monitoring reduced fluid flow through a filter;

FIG. 4A is an illustration of a method for monitoring reduced fluid flow through a filter;

FIG. 4B is another illustration of a method for monitoring reduced fluid flow through a filter; and FIG. 5 is a graphical illustration of cost over time due to pressure drop.

Figure 2A:
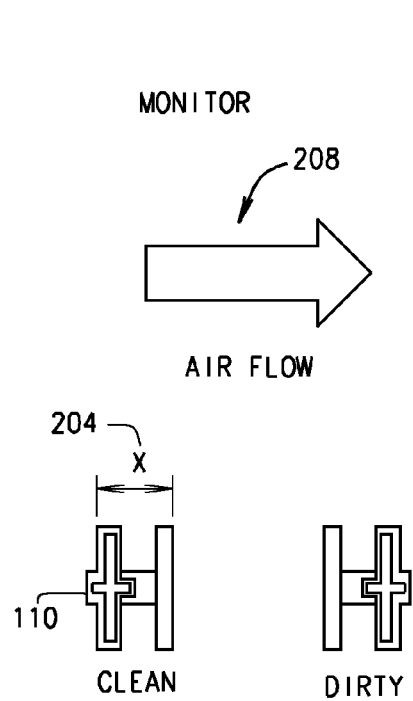
FIG. 2A is an illustration of the shuttle piston.

While the technology is susceptible to various modifications and alternative forms, specific implementations thereof are shown by way of example in the drawings and will herein be described in detail. It should be understood, however, that the drawings and detailed description presented herein are not intended to limit the technology to the particular implementation disclosed, but on the contrary, the intention is to cover all modifications, equivalents, and alternatives falling within the scope of the present technology as disclosed and as defined by the appended claims.

DESCRIPTION

According to the implementation (s) of the present technology, various views are illustrated in FIGS. 1-5 and like reference numerals are being used consistently throughout to refer to like and corresponding parts of the technology for all of the various views and figures of the drawing. Also, please note that the first digit(s) of the reference number for a given item or part of the technology should correspond to the Figure number in which the item or part is first identified.

One implementation of the present technology comprising poppet like mechanism responsive to pressure caused by restricted fluid flow teaches a novel apparatus and method for monitoring reduced fluid flow through a filter. The details of the technology as disclosed and various implementations can be better understood by referring to the figures of the drawing.

Referring to FIG. 1A and FIG. 1B, an apparatus for monitoring reduced fluid flow through a filter is shown 100 including an enclosed open ended channel 102 extending from a facing side 104 of a filter 108 to a trailing side 106 of the filter. The distance between the facing side 104 and the trailing side 106 is the distance d identified by 122. A shuttle piston 110 is shown slidably fitting within the open ended channel and is configured to resistively reciprocate through the open ended channel from the facing side of the filter to the trailing side of the filter responsive to a fluid flow pressure indicative of a predetermined reduction in a fluid flow 112. The shuttle piston can be configured with a retention tab 124 to retain the shuttle piston.

The shuttle piston 110 can be a member such as a ball, a disk or short cylinder, fitting closely within a channel 102, such as a duct or a tube, in which it freely or resistively reciprocates back and forth from one end of the channel 114 to an opposing end of the channel 116 (moves up and down) against or responsive to a liquid or gas flow or pressure. The member's movement can be similar to that of a piston valve element that moves freely within the tube. When pressure from a fluid is exerted through an opening on one end it pushes the member towards the opposite end. The pressure on the piston valve increases as the fluid flow is restricted due to a filter being contaminated with debris.

The resistance to reciprocation from one end to the opposing end can simply be due to the weight and surface area of the member is such that it will only be moved or caused to be reciprocated when a certain level of pressure is present from the fluid flow that is sufficient to move the particular weight. The shuttle piston will have friction between the shuttle piston surface and the interior surface of the channel where the frictional force will resist the relative movement of the shuttle piston. A dry friction interface or a lubricated friction interface can be utilized. Other characteristics can be designed into the shuttle piston to resist movement such as a surface of the shuttle piston 118 in contact with the channel's interior surface 120 can be roughened or uneven or the exterior surface of the shuttle piston can be constructed of a material that causes a resistive frictional force with contacting surfaces.

Figure 2B:
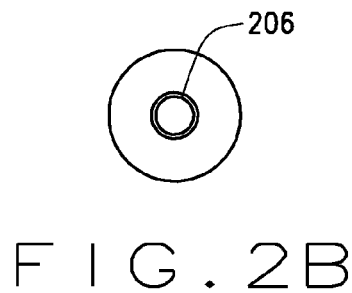
FIG. 2B is a further illustration of the shuttle piston.

Referring to FIG. 2, The shuttle piston 110 can be sized or configured where a size and a weight of the shuttle piston is based on one or more of a characteristic fluid flow of the filter, an area size of the facing side 104 of the filter, a distance x 204 from the facing side of the filter to the trailing side of the filter and the fluid flow pressure. Further, the shuttle piston has a trailing end, and where said trailing end is configured having a predetermined color providing a visual indicator 206. The direction of airflow 208 is also illustrated.

Figure 3:
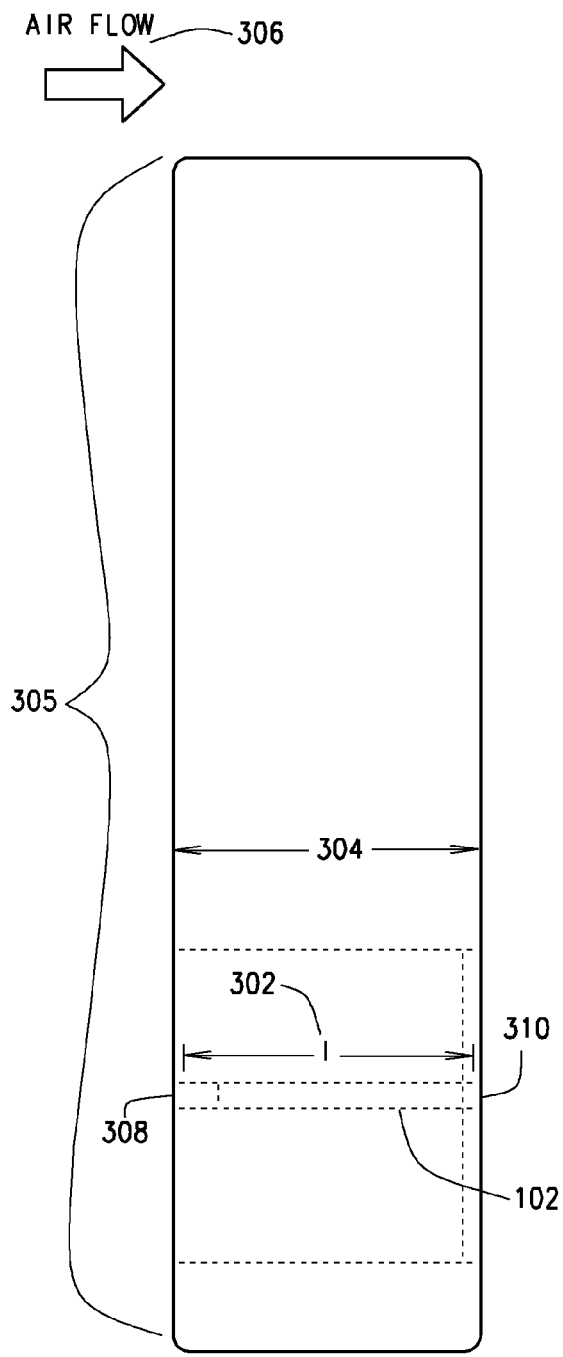
FIG. 3 is an illustration of an apparatus for monitoring reduced fluid flow through a filter extending a distance corresponding to a thickness of a predetermined filter size.

Referring to FIG. 3, one implementation of the technology includes an apparatus for monitoring reduced fluid flow through a filter, which includes an enclosed open ended channel 102 configured to extend a predetermined length l 302 where said predetermined length is sufficient to extend a distance corresponding to a thickness 304 of a predetermined filter size where the filter size can be defined by the thickness 304 and the facing area 305 which faces the oncoming fluid flow 306. The material density of the filter and the filtration rating of the filter can also be used to define the size or type of filter. For example, a micron rating is the size of particles which are filtered out by filters at a certain efficiency, such as an efficiency that is at least 98.6%, which filters 98.6% of all particles of micron size. The apparatus can include a shuttle piston slidably fitting within said open ended channel and configured to resistively reciprocate through said open ended channel from a facing side 308 of the open ended channel to a trailing side 310 of the open ended channel responsive to a predetermined fluid flow pressure. The size and a weight of the shuttle piston adjusted and configured based on one or more of a characteristic air flow, and the fluid flow pressure. Things that can affect air flow and fluid pressure are filtration rating, filter material density, facing area size of a filter and the filter's thickness. Again, the shuttle piston has a trailing end 310, and where said trailing end can be configured having a predetermined color providing a visual indicator.

When using the technology as disclosed herein with airflow systems, there can be many variations to the air filter design and material configurations being utilized. The design and material configuration variations combined with the variations of efficiencies, flow rates, and MERV, will cause variations in the size and construction of the air flow monitor. For example, the size and construction of the monitor can vary depending upon the construction, material, and depth of pleat of an air filter and can vary depending upon air flow in CFM. Each filter will need to have a flow monitor made to the filter's unique construction and unique air flow system environment. The size of the air flow monitor will also be dependent upon the construction of the monitor, and it's resistance to movement.

The air flow monitor measures pressure drop, or static pressure. This pressure drop is the amount of resistance as measured in inches of water (w.g.). When air moves through an air filter, the filter itself impedes the air flow. As the air filter becomes dirty/clogged the air flow becomes increasingly more impeded. This increases the pressure drop. Refer to the graphical illustration in FIG. 5. Energy consumption is a large portion of the cost of operating an airflow system, and pressure drop is an indication of higher energy consumption, which can be caused by a dirty filter. The filter should be changed at the correct time to maintain the operating efficiency of the airflow system. The timing of a filter change depends upon the operating efficiency, which can be determined based upon the pressure drop. Energy consumption for an air flow system is based on air flow rate ($m^3$/sec), average pressure loss, time in operation and fan efficiency. For example, based upon a 500 CFM air flow rate, and a 20"×20" filter, with a clean static pressure of 0.2 w.g. and a dirty static pressure of 0.8 w.g., an flow monitor with a 1" radius can be recommended. Also, as previously stated, the airflow monitor may vary depending on the construction of the filter.

Referring to FIG. 4A and FIG. 4B, a method for monitoring reduced fluid flow through a filter is illustrated including, extending 402 an enclosed open ended channel 404 extending from a facing side of a filter 406 through to a trailing side of the filter 408, where said enclosed open ended channel includes a shuttle piston 410 slidably fitting within said open ended channel and configured to resistively reciprocate through 412 said open ended channel from the facing side of the filter to the trailing side of the filter responsive to a fluid flow pressure indicative of a predetermined reduction in a fluid flow 414.

The method can include laterally installing the filter in a duct where the facing side of the filter is orthogonally oriented with respect to a direction of the fluid flow 416. When the filter becomes contaminated, the rate of fluid flow through the filter will be reduced 414 thereby increasing the pressure at the filter and can even cause the filter to buckle 418 due to increased pressure at the filter. When the pressure has reached a predetermined level, which is sufficient to cause the shuttle piston to reciprocate to the trailing side of the filter thereby providing an indicator that the filter should be removed. The method includes the step of removing and replacing the filter if the shuttle piston has reciprocated to the trailing side of the filter. The method provides an indicator indicative of the filter needing replacement. This can be accomplished by placing a predetermined color on a trailing end of the shuttle piston thereby providing a visual indicator.

The various implementations and examples shown above illustrate a method and system for monitoring fluid flow through a filter. A user of the present method and system may choose any of the above implementations, or an equivalent thereof, depending upon the desired application. In this regard, it is recognized that various forms of the subject filter monitoring method and system could be utilized without departing from the intent of the present implementation.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present implementation. Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single implementation for the purpose of streamlining the disclosure. This method of disclosure is not to be interpreted as reflecting an intention that the claimed implementations require more features than are expressly recited in each claim. Rather, as the following claims reflect, inventive subject matter may lie in less than all features of a single disclosed implementation. Thus, the following claims are hereby incorporated into the Detailed Description, with each claim standing on its own as a separate implementation.

The various filter monitoring examples shown above illustrate a novel apparatus and method. A user of the present technology may choose any of the above implementations, or an equivalent thereof, depending upon the desired application. In this regard, it is recognized that various forms of the subject filter could be utilized without departing from the scope of the present technology as disclosed.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed.

Other aspects, objects and advantages of the present technology can be obtained from a study of the drawings, the disclosure and the appended claims.

What is claimed is:

1. An apparatus for monitoring reduced fluid flow through a filter comprising:
   an enclosed open ended channel extending from a facing side of a filter to a trailing side of the filter; and
   a shuttle piston slidably fitting within said open ended channel and configured to resistively reciprocate through said open ended channel from the facing side of the filter to the trailing side of the filter responsive to a fluid flow pressure indicative of a predetermined reduction in a fluid flow.

2. The apparatus as recited in claim 1, where a size and a weight of the shuttle piston is based on one or more of a characteristic fluid flow of the filter, an area size of the facing side of the filter, a distance from the facing side of the filter to the trailing side of the filter and the fluid flow pressure.

3. The apparatus as recited in claim 1, where the shuttle piston has a trailing end, and where said trailing end is configured having a predetermined color providing a visual indicator.

4. An apparatus for monitoring reduced fluid flow through a filter comprising:

an enclosed open ended channel configured to extend a predetermined length where said predetermined length is sufficient to extend a distance corresponding to a thickness of a predetermined filter size; and a shuttle piston slidably fitting within said open ended channel and configured to resistively reciprocate through said open ended channel from a facing side of the open ended channel to a trailing side of the open ended channel responsive to a predetermined fluid flow pressure.

5. The apparatus as recited in claim 4, where a size and a weight of the shuttle piston is based on one or more of a characteristic air flow, and the fluid flow pressure.

6. The apparatus as recited in claim 4, where the shuttle piston has a trailing end, and where said trailing end is configured having a predetermined color providing a visual indicator.

7. A method for monitoring reduced fluid flow through a filter comprising:

extending an enclosed open ended channel extending from a facing side of a filter through to a trailing side of the filter, where said enclosed open ended channel includes a shuttle piston slidably fitting within said open ended channel and configured to resistively reciprocate through said open ended channel from the facing side of the filter to the trailing side of the filter responsive to a fluid flow pressure indicative of a predetermined reduction in a fluid flow.

8. The method as recited in claim 7, further comprising:

laterally installing the filter in a duct where the facing side of the filter is orthogonally oriented with respect to a direction of the fluid flow.

9. The method as recited in claim 8, further comprising:

removing and replacing the filter if the shuttle piston has reciprocated to the trailing side of the filter.

10. The method as recited in claim 9, further comprising:

placing a predetermined color on a trailing end of the shuttle piston providing a visual indicator.

\* \* \* \* \*